United States Patent
Lundy et al.

(10) Patent No.: US 10,464,485 B2
(45) Date of Patent: Nov. 5, 2019

(54) TOGGLE SWITCH LOCK AND CUSHIONED TOGGLE SWITCH FOR FDM

(71) Applicant: Gentex Corporation, Zeeland, MI (US)

(72) Inventors: Eric S. Lundy, Grand Rapids, MI (US); Jason D. Hallack, Allendale, MI (US); Richard A. Berry, Zeeland, MI (US); Christopher D. Pollack, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/405,484

(22) Filed: Jan. 13, 2017

(65) Prior Publication Data

US 2017/0203694 A1    Jul. 20, 2017

Related U.S. Application Data

(60) Provisional application No. 62/279,144, filed on Jan. 15, 2016.

(51) Int. Cl.
*B60R 1/02* (2006.01)
*B60R 1/04* (2006.01)
(Continued)

(52) U.S. Cl.
CPC ............. *B60R 1/025* (2013.01); *B60R 1/04* (2013.01); *B60R 1/086* (2013.01); *B60R 1/12* (2013.01); *B60R 2001/1215* (2013.01)

(58) Field of Classification Search
CPC .......... B60R 1/025; B60R 1/086; B60R 1/04; B60R 1/088; B60R 1/06; B60R 1/072; B60R 1/0617; B60R 1/02; A47G 1/16
(Continued)

(56) References Cited

U.S. PATENT DOCUMENTS 3,421,728 A    1/1969   Gordon
3,522,987 A *  8/1970   Pflaum ................... B60R 1/086
                                                    359/606
(Continued)

FOREIGN PATENT DOCUMENTS

EP    0202757 A2    4/1985
EP    1068994 A2    1/2001
(Continued)

OTHER PUBLICATIONS

International Searching Authority, International Search Report and Written Opinion for International Application No. PCT/US2017/013333, dated Jun. 8, 2017, 8 pages.
(Continued)

*Primary Examiner* — Stephone B Allen
*Assistant Examiner* — Rahman Abdur
(74) *Attorney, Agent, or Firm* — Price Heneveld LLP; Bradley D. Johnson

(57) ABSTRACT

A rearview mirror includes a housing defining an interior cavity and an opening to an exterior of the housing, a notch extending from an edge of the opening and an actuation mechanism coupled within the interior of the housing. The actuation mechanism has a toggle barrel rotatably positioned within the interior cavity of the housing and a lever extending from the toggle barrel through the opening. The lever defines a first major surface and includes a locking rib extending from the first major surface adjacent the barrel. The lever and toggle barrel are rotatable between a first position and a second position, the locking rib being positioned within the notch of the housing when the lever and the toggle barrel are in the first position and being positioned away from the notch when the lever and the toggle barrel are in the second position.

20 Claims, 9 Drawing Sheets

(51) Int. Cl.
*B60R 1/08* (2006.01)
*B60R 1/12* (2006.01)

(58) Field of Classification Search
USPC ....... 359/604, 601, 607, 872, 873, 871, 875; 248/477, 478, 479, 481
See application file for complete search history.

(56) References Cited

U.S. PATENT DOCUMENTS

| | | | |
|---|---|---|---|
| 4,826,289 A | | 5/1989 | Vandenbrink et al. |
| 4,895,337 A | | 1/1990 | Oksam et al. |
| 5,634,859 A | * | 6/1997 | Nesbitt ................ A63B 53/14 473/300 |
| 5,969,870 A | | 10/1999 | Jain et al. |
| 5,971,550 A | * | 10/1999 | Delannoy ............... B60R 1/008 248/478 |
| 6,227,675 B1 | | 5/2001 | Mertens et al. |
| 6,318,870 B1 | | 11/2001 | Spooner et al. |
| 6,682,122 B1 | * | 1/2004 | Prokhorov ............ B60J 3/0208 296/97.4 |
| 7,255,451 B2 | | 8/2007 | McCabe |
| 7,722,199 B2 | | 5/2010 | DeWard et al. |
| 8,508,831 B2 | * | 8/2013 | De Wind ................ B60R 1/04 340/425.5 |
| 2003/0011908 A1 | | 1/2003 | Marusawa et al. |
| 2003/0137757 A1 | | 7/2003 | Wachi |
| 2005/0068647 A1 | | 3/2005 | Brandt |
| 2005/0248847 A1 | | 11/2005 | Weimer |
| 2008/0049344 A1 | | 2/2008 | DeWard |

FOREIGN PATENT DOCUMENTS

| | | |
|---|---|---|
| JP | 61103636 A | 5/1986 |
| JP | 2006103621 A | 4/2006 |
| KR | 19980036682 U | 9/1998 |
| KR | 20050028681 A | 3/2005 |

OTHER PUBLICATIONS

International Search Report and Written Opinion of the International Searching Authority, or the Declaration dated May 12, 2016 for International Application No. PCT/US2016/018956, filed Feb. 22, 2016, 8 pages.

International Search Report and Written Opinion of the International Searching Authority, or the Declaration dated Jun. 20, 2016 for International Application No. PCT/US2016/018950, filed Feb. 22, 2016, 6 pages.

European Search Report for Application No. 17738999.6-1132, dated Oct. 4, 2018, 7 pages.

* cited by examiner

TOGGLE SWITCH LOCK AND CUSHIONED TOGGLE SWITCH FOR FDM

CROSS REFERENCE TO RELATED APPLICATION

This application claims priority under 35 U.S.C. § 119(e) to U.S. Provisional Application No. 62/279,144, filed on Jan. 15, 2016, entitled "TOGGLE SWITCH LOCK AND CUSHIONED TOGGLE SWITCH FOR FDM," the disclosure of which is hereby incorporated herein by reference in its entirety.

TECHNOLOGICAL FIELD

The present disclosure relates generally to a mechanism for preventing undesired movement of a rearview mirror assembly for a motor vehicle between use positions. In one aspect, the mechanism may prevent inadvertent movement of a full-display rearview mirror from an active to an inactive position.

BACKGROUND

Vehicle rearview mirrors of the so-called "flipper mirror" type include an actuation mechanism driven by an external lever to move the mirror surface between night and day modes that use different features of the mirror to reflect light at different levels. These actuation mechanisms are configured to be stable in both such positions and otherwise to be urged toward the closest of the stable positions. Known rearview mirror toggle mechanisms may be susceptible to inadvertent actuation, particularly when in the night position, wherein the mirror substrate is angled upwardly toward the vehicle headliner. Such inadvertent actuation may be caused by a user adjusting the position of the substrate by grasping and moving the mirror housing, intending to move the housing relative to an associated mounting structure. During such movement, particular forces can urge the housing toward the opposite stable position with respect to the mounting structure, which may cause such inadvertent actuation of the actuation mechanism and corresponding movement of the housing and, accordingly, the substrate into the opposite stable position. In the case of a standard prism mirror, such inadvertent actuation may be inconvenient.

SUMMARY

According to an aspect of the present disclosure, a rearview mirror for a vehicle includes a housing defining an interior cavity and an opening to an exterior of the housing, a notch extending from an edge of the opening and an actuation mechanism coupled within the interior of the housing. The actuation mechanism has a toggle barrel rotatably positioned within the interior cavity of the housing and a lever extending from the toggle barrel through the opening. The lever defines a first major surface and includes a locking rib extending from the first major surface adjacent the barrel. The lever is rotatable with corresponding rotation of the toggle barrel with respect to the housing between a first position and a second position, the locking rib being positioned within the notch of the housing when the lever and the toggle barrel are in the first position and being positioned away from the notch when the lever and the toggle barrel are in the second position.

According to another aspect of the disclosure, a vehicle includes a windshield, a headliner adjacent an upper edge of the windshield, and a mirror assembly. The mirror assembly includes a housing defining an interior cavity and an opening to an exterior of the housing, a notch extending from an edge of the opening, and an actuation mechanism coupled within the interior of the housing. The actuation mechanism has a toggle barrel rotatably positioned within the interior cavity of the housing and a lever extending from the toggle barrel through the opening. The lever defines a first major surface and includes a locking rib extending from the first major surface adjacent the barrel. The lever is rotatable with corresponding rotation of the toggle barrel with respect to the housing between a first position and a second position, the locking rib being positioned within the notch of the housing when the lever and the toggle barrel are in the first position and being positioned away from the notch when the lever and the toggle barrel are in the second position.

According to another aspect of the disclosure, a rearview mirror for a vehicle includes a housing defining an interior cavity and an opening to an exterior of the housing, a notch extending from an edge of the opening and an actuation mechanism coupled within the interior of the housing. The actuation mechanism includes a toggle barrel rotatably positioned within the interior cavity of the housing and a lever extending from the toggle barrel through the opening. The lever defines a first major surface and includes a locking rib extending from the first major surface adjacent the barrel. The lever is rotatable with corresponding rotation of the toggle barrel with respect to the housing including into a first position wherein the locking rib is forcibly engaged with the notch to resist movement of the lever out of the first position.

These and other features, advantages, and objects of the present device will be further understood and appreciated by those skilled in the art upon studying the following specification, claims, and appended drawings.

DETAILED DESCRIPTION OF EMBODIMENTS

Figure 1:
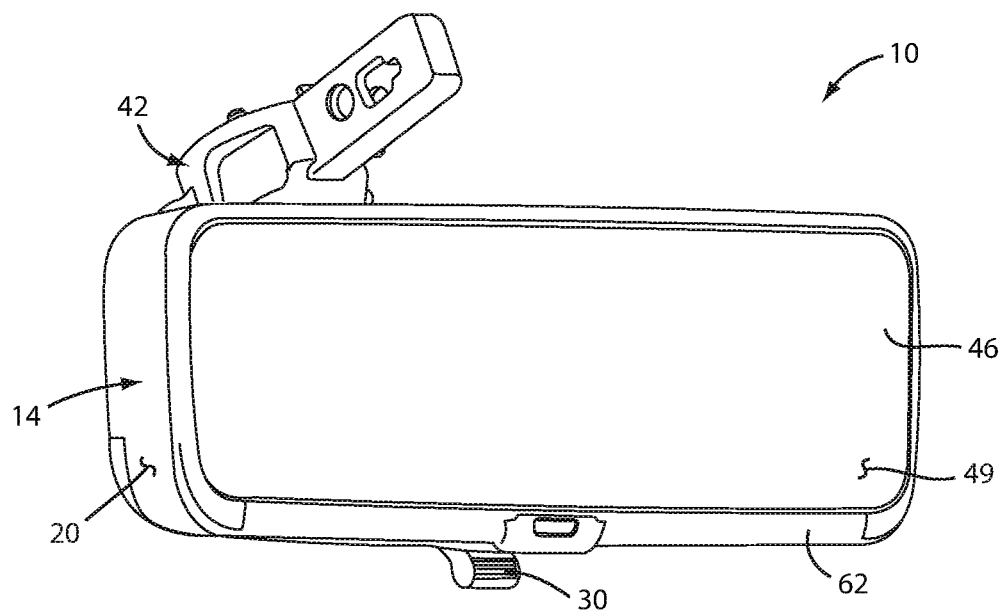
FIG. 1 is a front perspective view of a rearview mirror assembly according to an embodiment of the disclosure in a first state.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
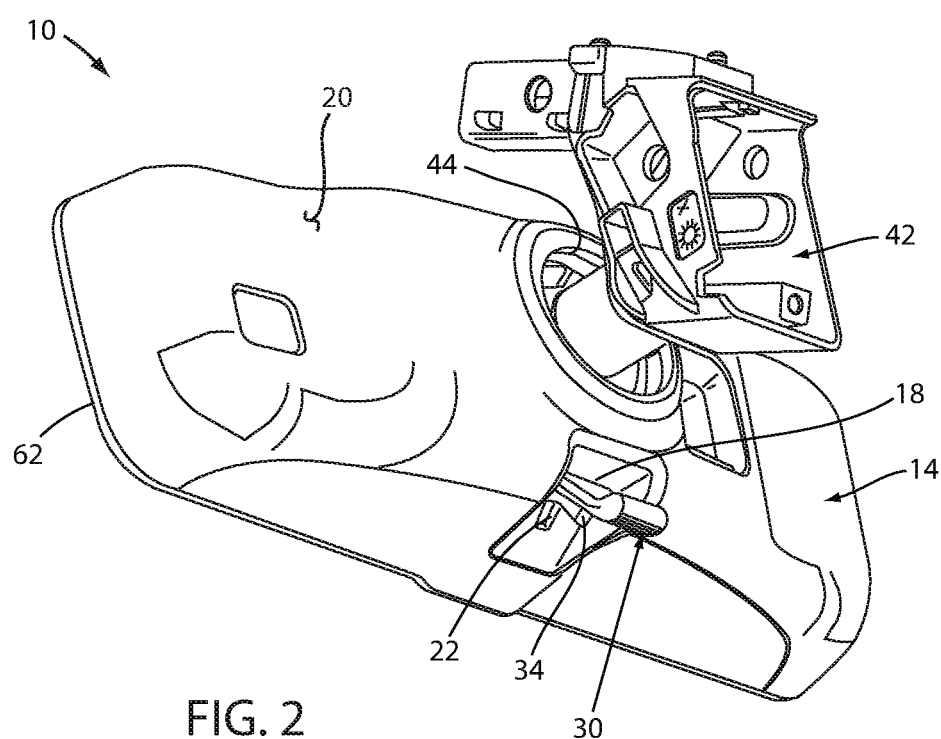
FIG. 2 is a back-lower perspective view of the rearview mirror assembly of FIG. 1 in a second state.
Figure 3:
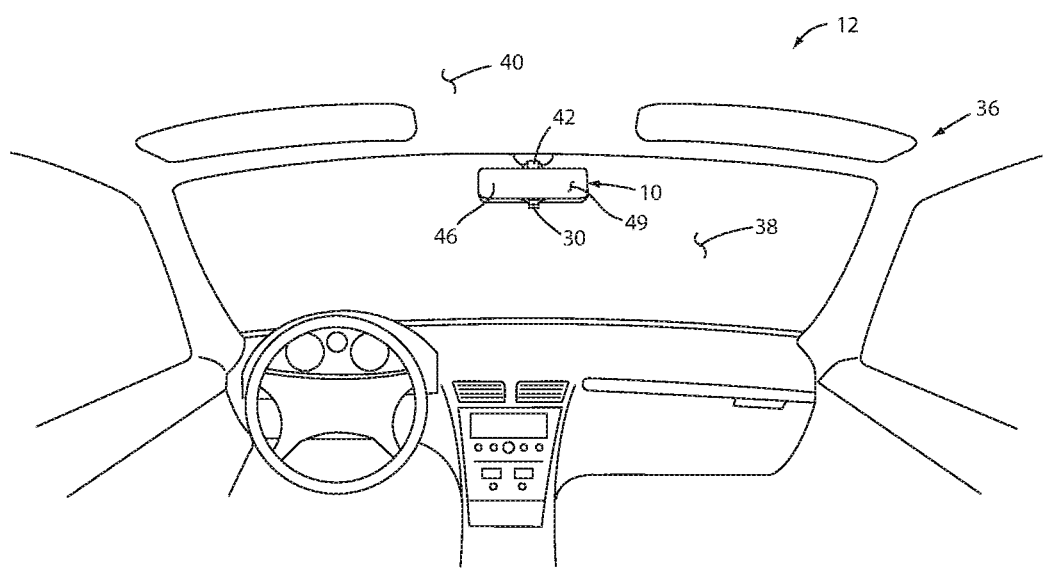
FIG. 3 is a perspective view of an interior of a vehicle including the rearview mirror assembly of FIG. 1.

As shown in FIGS. 1-12, reference numeral 10 generally designates a rearview mirror 10 useable within a vehicle 12 (FIG. 3). The rearview mirror 10 includes a housing 14 defining an interior cavity 16 (FIG. 4) and an opening 18 to an exterior 20 of the housing 14. A notch 22 extends from an edge 24 of the opening 18. The rearview mirror 10 also includes an actuation mechanism 26 coupled within the interior cavity 16 of the housing 14. The actuation mechanism 26 includes a toggle barrel 28 rotatably positioned within the interior cavity 16 of the housing 14 and a lever 30 extending from the toggle barrel 28 through the opening 18. The lever 30 defines a first major surface 32 and includes a locking rib 34 extending from the first major surface 32 adjacent the barrel 28. The lever 30 is rotatable with corresponding rotation of the toggle barrel 28 with respect to the housing 14 between a first position (FIG. 1) and a second position (FIG. 2). The locking rib 34 is positioned within the notch 22 of the housing 14 when the lever 30 and the toggle barrel 28 are in the first position and is positioned away from the notch 22 when the lever 30 and the toggle barrel 28 are in the second position.

As shown in FIG. 3, rearview mirror 10 can be used in connection with a vehicle interior 36. In particular, rearview mirror 10 can be mounted adjacent a windshield 38 of vehicle 12 either by attachment with the windshield 38 itself or to an internal component adjacent headliner 40 (which may include a portion of the vehicle frame, a vehicle panel, or other support structure, for example). As shown further in FIGS. 1-2 and 6-10, such attachment is achieved by a mounting arm 42 that is coupled with vehicle 12, as described, and couples with actuation mechanism 26 (as shown in FIGS. 6-12), as explained further below, by extending through an aperture 44 in housing 14. Opposite aperture 44, a substrate 46 is positioned over an open side 64 of housing 14. Substrate 46 is generally configured to present an image to a driver of vehicle 12 of the view to the rear of vehicle 12 and, accordingly, may be adjustable by movement of housing 14 about mounting arm 42. In one embodiment, substrate 46 can include a video display along a portion or an entirety thereof such that rearview mirror 10 is what may be referred to as a full-display mirror. Substrate 46 including such a display is referred to herein as "display substrate 46" and may be capable of displaying a mirror-image of the view to the rear of vehicle 12 (that may be captured by an appropriately-positioned video camera or the like) when the display is in an active state. Such an image may generally replicate that which would be available from a typical reflective mirror and can be supplemented with other information presented on display substrate 46. In combination with such a display substrate 46, a reflective surface 49 may be applied so as to overlie the display as a coating or separate element having properties to both provide a reflected image as well as to permit a video image of display substrate 46 to be visible therethrough.

The presence of reflective surface 49 permits substrate 46 to be used as a standard rearview mirror (i.e. without the need to view the displayed image) when the display is inactive, which may occur when the related vehicle 12 is not running or when power to the display substrate 46 is interrupted, for example. When in the active state, however, the presence of the reflective surface 49 over display substrate 46 can cause the image reflected by reflective surface 49 to compete with an image presented on display substrate 46. To alleviate such image competition, substrate 46 can be positioned such that reflective surface 49 reflects an image of the headliner 40 toward the driver. Because vehicle headliners are of generally consistent, non-reflective material, such an image may compete less with the video image of display substrate 46.

Figure 7:
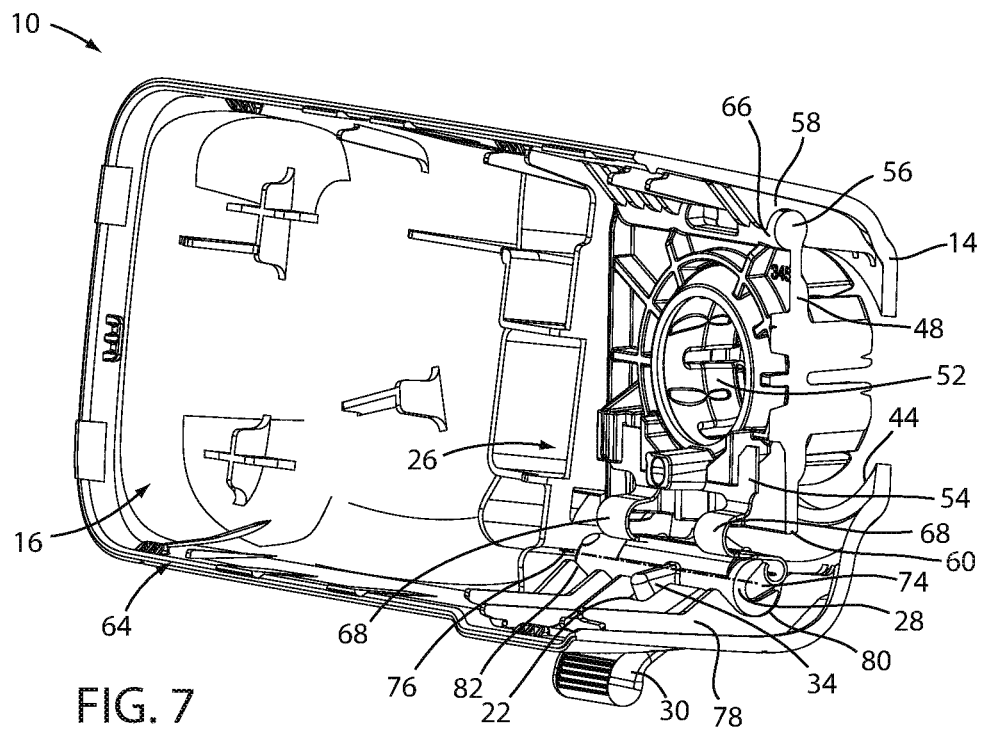
FIG. 7 is a side perspective cross-section view of a portion of the rearview mirror assembly of FIG. 1 in the first state.
Figure 8:
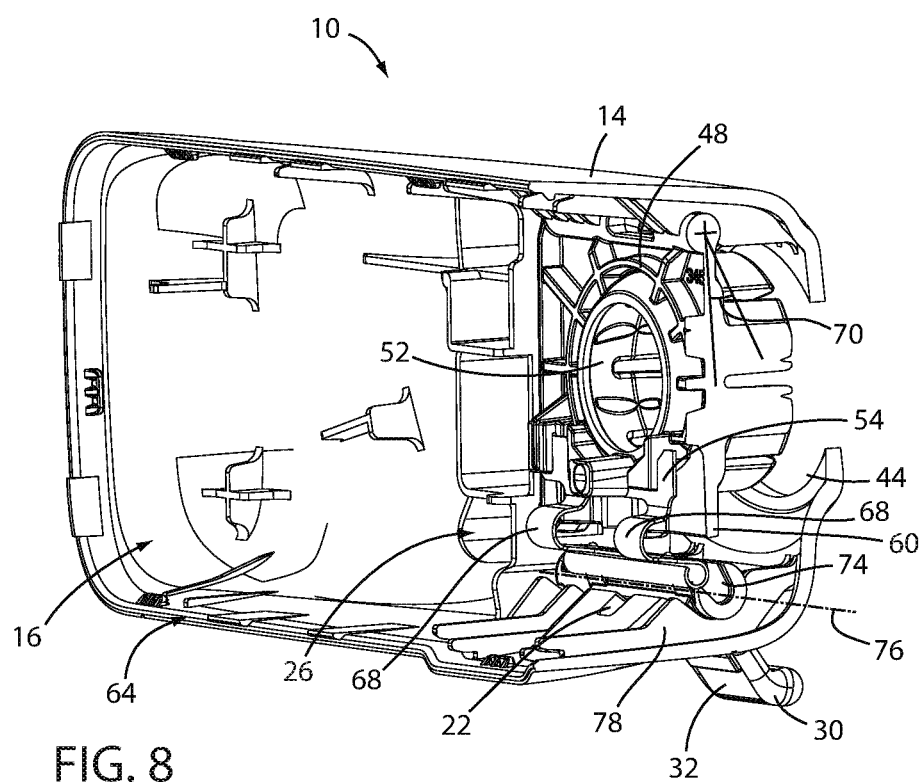
FIG. 8 is a side perspective cross-section view of the portion of the rearview mirror assembly of FIG. 7 in the second state.

Rearview mirror 10, by way of the actuation mechanism 26, spring plate 54, and toggle barrel 28 can provide for a user to control repositioning of display substrate 46 between an appropriate position thereof for use of reflective surface 49 when display substrate 46 is in the inactive state and for viewing of a displayed image, without undesirable competition, when display substrate 46 is in the active state. As described further, below, such movement can be achieved by manipulation of lever 30 between the first position, shown in FIG. 1, to the second position, shown in FIG. 2, which can cause actuation mechanism 26 to change from a first stable configuration (as shown in FIG. 7) to a second stable configuration (as shown in FIG. 8), which in turn causes movement of housing 14 and substrate 46 through a predetermined angle relative to mounting arm 42. In an example, such movement can be through a downward (i.e. away from headliner 40) angle of between about 5° and 10°, and in one embodiment about 6°.

Figure 6:
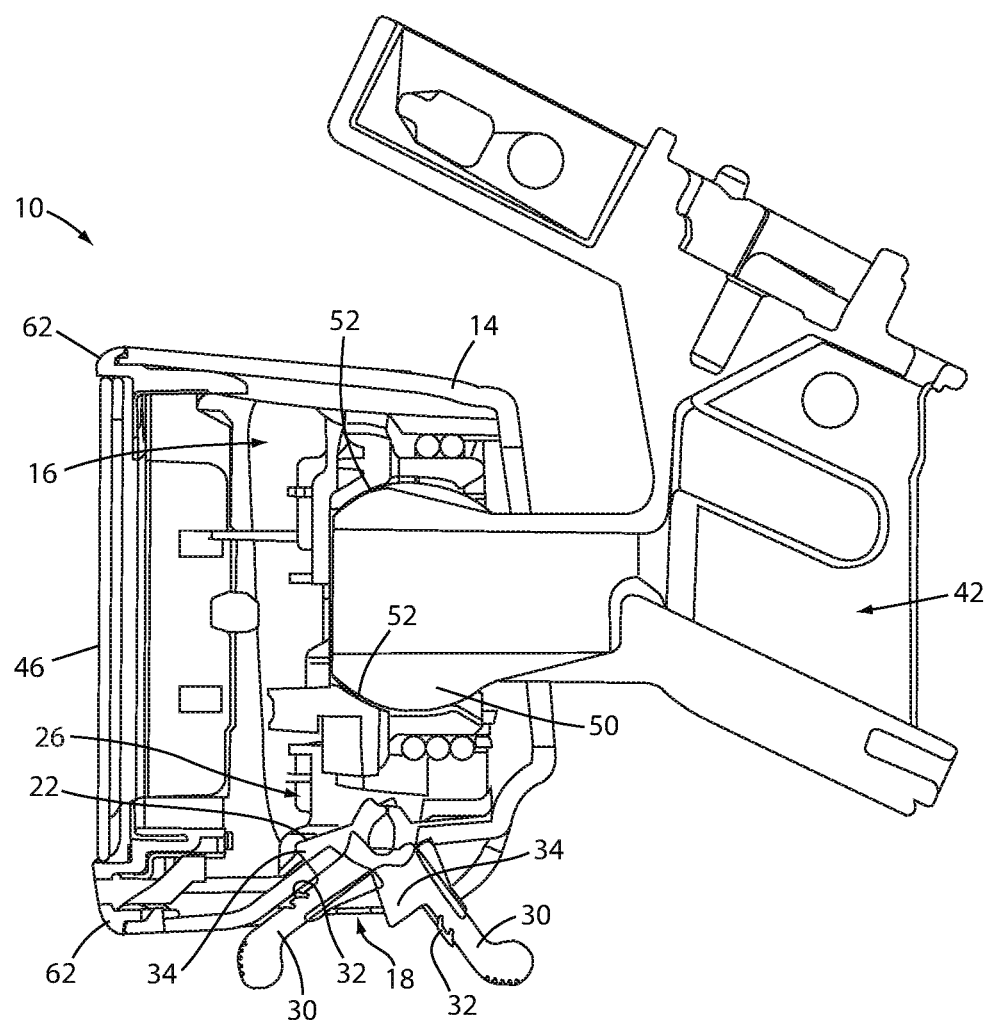
FIG. 6 is a cross-section view of the rearview mirror assembly of FIG. 1, taken along a longitudinal midplane thereof.

As shown in the cross-section views of FIGS. 6-8, mounting arm 42 can couple with actuation mechanism 26 by attachment with a mounting plate 48 thereof by a ball 50 and socket 52 arrangement. This arrangement can allow for the above-mentioned general adjustment of substrate 46 so as to position substrate 46 at a desired position with respect to the driver for viewing of the image presented on display substrate 46. As described further below, movement of lever 30 from the first position to the second position, for example, can cause movement of housing 14 relative to mounting plate 48, while mounting plate 48 remains generally static. Such a configuration can allow substrate 46 to toggle between the positions for substrate 46 provided by the above-referenced stable conditions of actuation mechanism 26 without changing the positions themselves.

In another embodiment, rearview mirror 10 may be a standard mirror, in which substrate 46 is a prism-type mirror substrate 46, which provides for a viewing angle at which substrate 46 reflects the rearward view of mirror 10 with a reduced luminosity to provide a dimming effect useful when driving at night, for example. In such an embodiment, the dimmed viewing angle for substrate 46 may be at a predetermined angle upward (i.e. toward headliner 40) relative to the "normal" viewing angle. As such, lever 30 may allow a user to adjust the substrate 46 from the standard viewing mode to the upward, dimmed mode, by movement thereof to change the state of the actuation mechanism 26, without changing the position of substrate 46 in the standard mode and, further, providing for movement into the dimmed mode such that substrate 46 provides generally the same view in the dimmed mode as has been selected for the standard mode.

In either embodiment, the mechanism by which lever 30 repositions substrate 46 may be generally similar in function to known rearview mirror toggle mechanisms with potential modifications to suit, for example, the use to move substrate 46 between the above-described active and passive positions. In general, such mechanisms may be susceptible to inadvertent actuation, particularly when in the above-described first position, wherein substrate 46 is angled upwardly toward headliner 40. Such inadvertent actuation may be caused by a user adjusting the position of substrate 46 by grasping and moving housing 14, intending to move housing 14 relative to mounting arm 42 by movement of mounting plate 48 relative thereto. During such movement, particular forces can urge housing 14 toward the second stable position with respect to mounting plate 48, which may cause such inadvertent actuation of actuation mechanism 26 and corresponding movement of housing 14 and, accordingly, substrate 46 into second position. In the case of a standard prism mirror, such inadvertent actuation may be inconvenient. Further, in the case of a display mirror, as described above, movement out of the first position may trigger deactivation of display substrate 46, meaning that the desired view from rearview mirror 10 may change. Accordingly, it may be beneficial to limit inadvertent actuation in either embodiment.

As mentioned above, movement of housing 14 relative to mounting arm 42 is facilitated by the internal components of rearview mirror 10. With continued reference to FIGS. 6-8, such internal components include toggle barrel 28, mounting plate 48, and a spring plate 54 that generally operably couples mounting plate 48 and toggle barrel 28 such that rotation thereof by lever 30 can move housing 14 in a desired rotation thereof about a first end 56 of mounting plate 48. Mounting plate 48 can couple a mounting structure 58 within housing 14. As discussed above, housing 14 defines an aperture 44 positioned adjacent mounting plate 48 such that mounting arm 42 can pass therethrough, thus allowing mounting plate 48 to couple with mounting arm 42 to retain rearview mirror 10 in an adjustable position with respect to windshield 38 or headliner 40. Accordingly, the above-described relative movement of housing 14 with respect to mounting plate 48 causes movement of housing 14 (and accordingly substrate 46 coupled therewith) in the form of rotation thereof about first end 56 of mounting plate 48. Such movement, in turn, moves substrate 46 between the above-described active (FIG. 1) and inactive (FIG. 2) positions. As mentioned above, such orientation can be achieved by rotation of mounting plate 48 with respect to housing 14 through an angle of about 6°, although such an angle can vary based on the location and structure of rearview mirror 10.

As described above, movement of housing 14 and substrate 46 can be achieved by the above-described operative coupling of toggle barrel 28 with spring arms 68. In this arrangement, rotation of toggle barrel 28, such as by manipulation of lever 30, moves toggle barrel 28 in a generally outward or inward direction with respect to a second end 60 of mounting plate 48, thereby causing rotation of housing 14, within which toggle barrel 28 is rotatably mounted, and substrate 46 about first end 56 of mounting plate 48 upward or downward about mounting structure 58 with which mounting plate 48 is rotatably fixed, as discussed further below.

Figure 4:
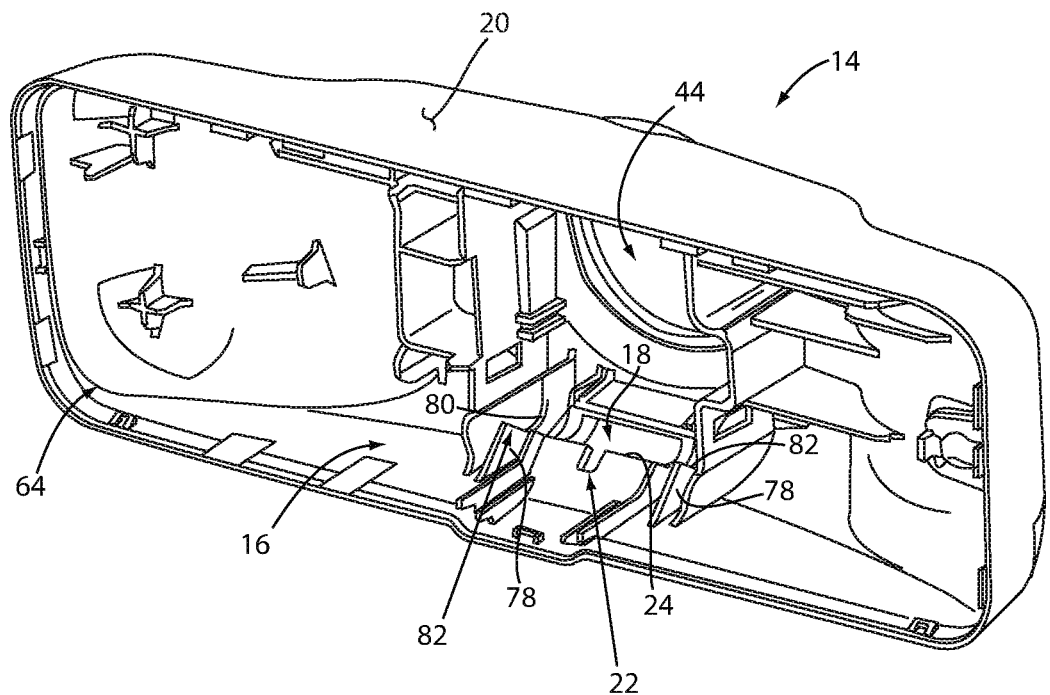
FIG. 4 is a front perspective view of a housing portion of the rearview mirror assembly of FIG. 1.
Figure 5:
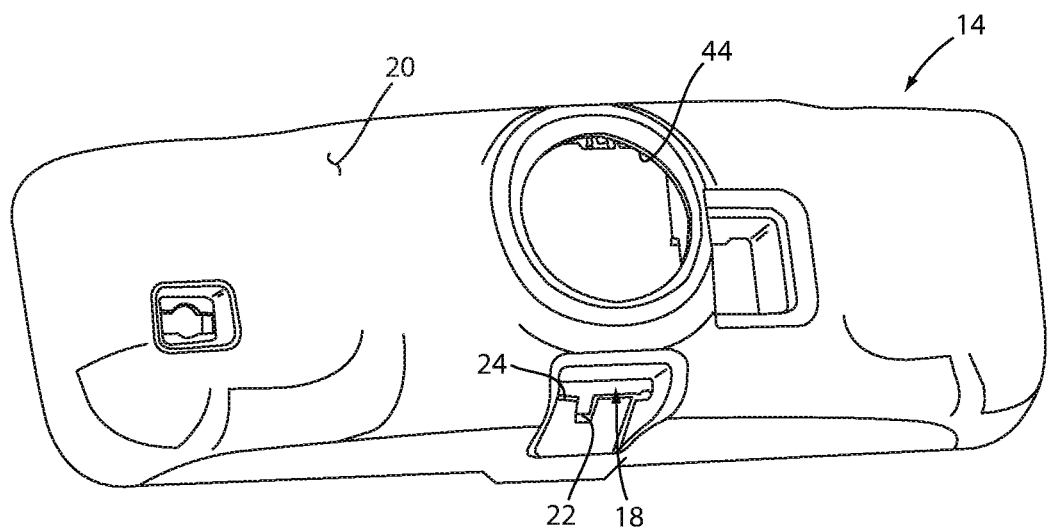
FIG. 5 is a rear perspective view of the housing portion of FIG. 4.

As shown in FIGS. 4 and 5, housing 14 is shown in the form of a single-piece structure, and can further be made from a single piece of injection molded plastic or the like, although other materials are possible. As shown in FIG. 1, substrate 46 can be coupled with a bezel 62, or other secondary housing piece, that can, in turn, be coupled with housing 14 to fix substrate 46 over an open side 64 of housing 14. In another example, substrate 46 can be coupled directly to housing 14 over open side 64. In either example, housing 14 is structured so that interior cavity 16 is of a sufficient depth to retain internal structures thereof, including actuation mechanism 26 (FIG. 7), and other related structures, as well as control circuitry for display substrate 46.

Returning to FIGS. 7 and 8, mounting plate 48, as described above, is rotatably coupled with housing 14 at first end 56 thereof. Such coupling can be achieved by the incorporation of a first hinge portion 66 into first end 56 of mounting plate 48 and by configuring mounting structure 58 as a mating second hinge portion. Alternatively, a separate hinge (not shown) can be coupled between mounting plate 48 and housing 14. As further shown in FIGS. 4 and 5, mounting plate 48 can generally extend through a majority of a vertical height of housing 14.

It may be desirable to structure toggle barrel 28, spring plate 54 (including spring arms 68, which extend therefrom to couple spring plate 54 with toggle barrel 28), and mounting plate 48 such that, as discussed above, the operable coupling of spring arms 68 with toggle barrel 28 provides two stable positions for toggle barrel 28 that correspond to the first (FIG. 1) and second (FIG. 2) positions for housing 14, which are angularly spaced-apart from each other by angle 70 which may be between about 5° and about 10° (and in an embodiment about 6°). Further, such rotation of housing 14 about mounting plate 48 can be achieved through rotation of toggle barrel 28 through an angle of between about 70° and 100° and in one embodiment about 80°, for example.

As discussed previously, the coupling of spring arms 68 with toggle barrel 28 can provide both for the desired rotation of housing 14 and for the above-noted stable positions. In particular, spring arms 68 are coupled with toggle barrel 28 by engagement thereof within slot 74 (further illustrated in FIGS. 11 and 12), which is configured so as to receive spring arms 68 (such as by a cradling, snap, or press-fit arrangement) and to maintain a general position thereof that is offset from an axis 76, about which toggle barrel 28 rotates.

The offset arrangement of slot 74 with respect to axis 76 is such that slot 74 translates in the longitudinal horizontal direction upon rotation of toggle barrel 28 about axis 76. This translation causes movement of spring arms 68, which are coupled therewith, resulting in rotation of mounting plate 48 about first end 56. Spring arms 68 are of a resiliently deformable material, such as metal (e.g. spring steel, aluminum, or the like), for example, which may be the same as the entirety of spring plate 54 with which spring arms 68 may be integrally joined. The resilient deformability of spring arms 68 allows them to accommodate the component movement of slot 74 in the vertical direction during the rotation thereof that results in the aforementioned longitudinal horizontal translation. Spring arms 68 can further be tuned to provide the above-noted stable positions for actuation mechanism 26 and, accordingly, rearview mirror 10.

In particular, the resilient deformability of spring arms 68 may be such that spring arms 68 exert a spring force opposing the compression thereof that results from the vertical movement component of slot 74 during rotation of toggle barrel 28 about axis 76, such a force being sufficient to overcome the internal forces of actuation mechanism 26 (e.g. friction between and among the various components thereof) and to urge toggle barrel 28 into either of the positions thereof that are associated with the first position (as shown in FIG. 1) and the second position (as shown in FIG. 2), upon slot 74 passing a vertical-most position during rotation thereof. In other words, spring arms 68 can provide a generally vertically-downward force on slot 74 that urges rotation of toggle barrel 28 when slot 74 is on either side of the vertical-most position during rotation thereof, such force urging the actuation mechanism 26 to the nearest stable position. Spring arms 68 can, further, be configured so as to be under compression so as to be biased against toggle barrel 28 when actuation mechanism 26 is in either stable position.

Figure 9:
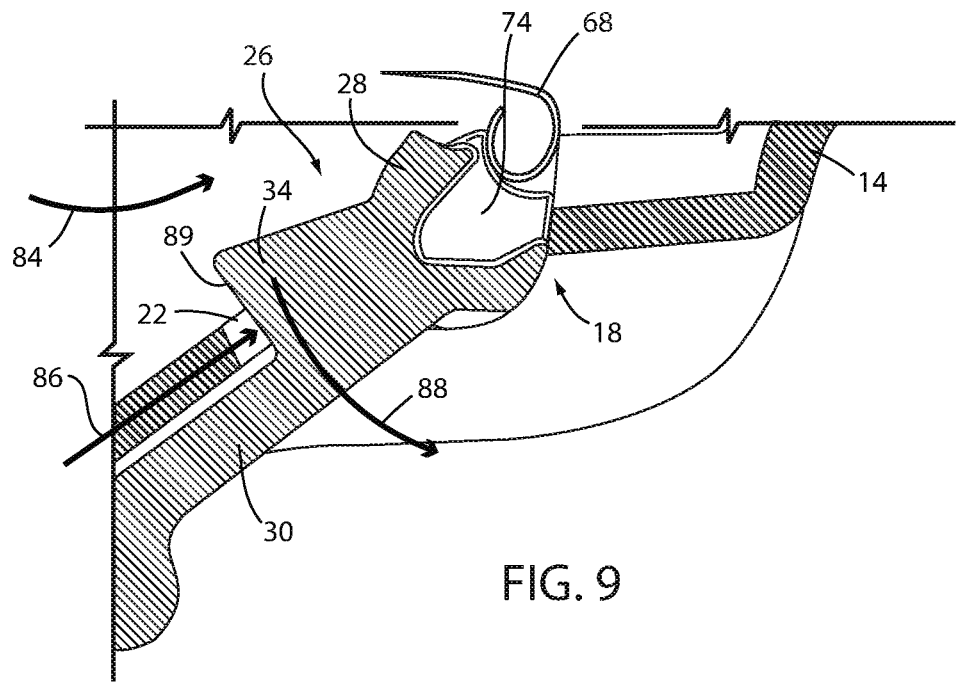
FIG. 9 is a cross-sectional detail view of a portion of the rearview mirror assembly of FIG. 1 in the first state.

As illustrated in FIGS. 1, 2, and 6, the movement of housing 14 between the first (FIG. 1) and second (FIG. 2) positions by actuation mechanism 26 is achieved by movement of lever 30 from corresponding first and second positions. As shown, lever 30 is coupled with (and can, further be integrally-formed with) toggle barrel 28 such that the movement of lever 30 from the first position (FIG. 1) to the second position (FIG. 2) causes corresponding movement of toggle barrel 28 and, therefore, the above-described movement of housing 14. As further illustrated in FIGS. 9 and 10, locking rib 34 extends from first major surface 32 of lever 30 (and may also join with an adjacent portion of toggle barrel 28) such that, when lever 30 and housing 14 are in their respective first positions (FIGS. 1 and 9), locking rib 34 extends into notch 22 adjacent the opening 18 through which lever 30 extends. Because movement of actuation mechanism 26 between the first and second stable conditions requires movement of lever 30, inadvertent movement of actuation mechanism 26 out of the first stable condition (FIG. 7) can be resisted or prevented by retaining lever 30 in the first position (FIG. 9). Accordingly, engagement between locking rib 34 and notch 22 can potentially prevent inadvertent actuation of actuation mechanism 26 due to forcible movement of housing 14 when housing 14 is in the first position (FIG. 1).

Figure 10:
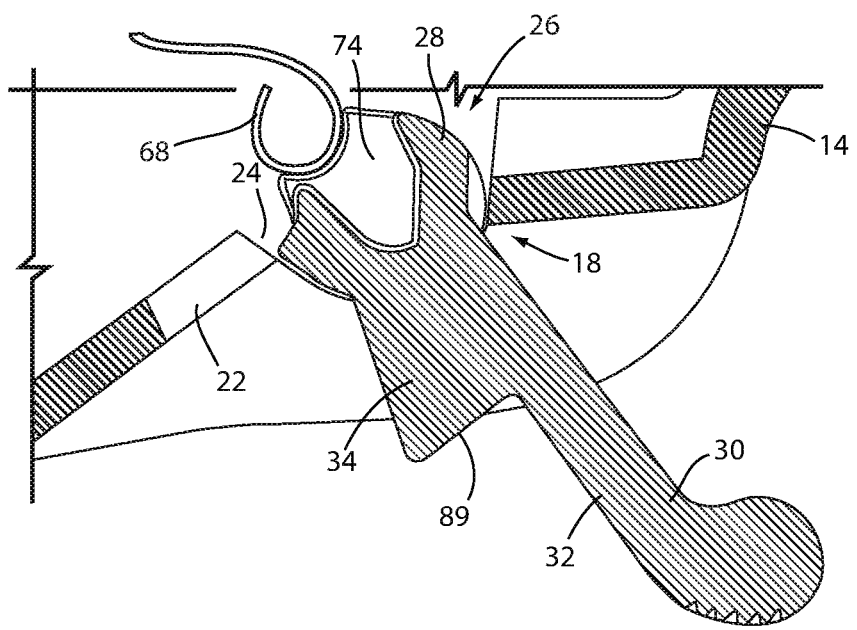
FIG. 10 is a cross-sectional detail view of the portion of the rearview mirror assembly of FIG. 9 in the second state.

With continued reference to FIGS. 9 and 10, and additional reference to FIG. 4, it can be seen that toggle barrel 28 is rotatably positioned within housing 14 by being supported on support ribs 78 that are integral with housing 14. Each support rib 78 includes an arched cradle portion 80 and an adjacent ramp portion 82. During normal use, the force of spring arms 68 on toggle barrel 28 can maintain toggle barrel 28 in contact with cradle portion 80, including during rotation thereof due to a force applied on lever 30, such as from the first position (FIG. 9) to the second position (FIG. 10). In the event that a force is applied to housing 14, such as during adjustment of the position and orientation of substrate 46, including force 84, shown in FIG. 9, that corresponds with movement of housing 14 in the direction of the second position thereof and that may cause the above-mentioned inadvertent actuation, the orientation of ramp portion 82 and/or the tuning of spring arms 68 may allow toggle barrel 28 to move at least partially into ramp portions 82. Such movement allows housing 14 to rotate in the direction of force 84 slightly, which causes notch 22 to move in direction 86 and into contact with locking rib 34. Such movement can be less than the movement required to rotate toggle barrel 28 to the point that it is urged toward the second stable position (FIG. 10) such that forcible engagement is made between notch 22 and locking rib 34 before inadvertent actuation occurs.

Figure 11:
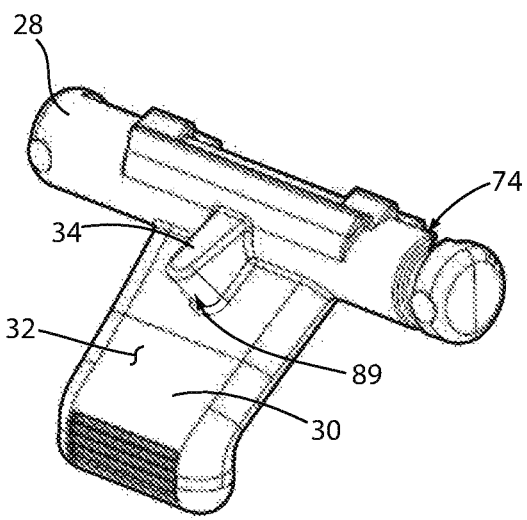
FIG. 11 is a front perspective view of a part included in the rearview mirror assembly of FIG. 1.
Figure 12:
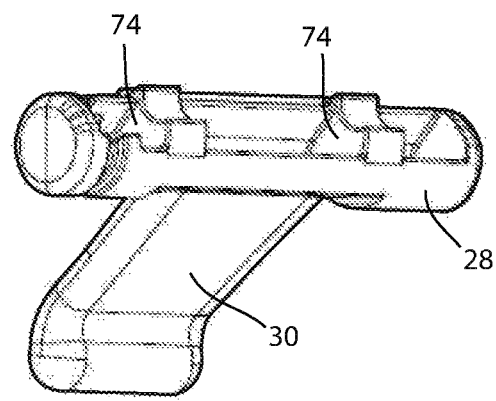
FIG. 12 is a rear perspective view of the part of FIG. 11.
Figure 13:
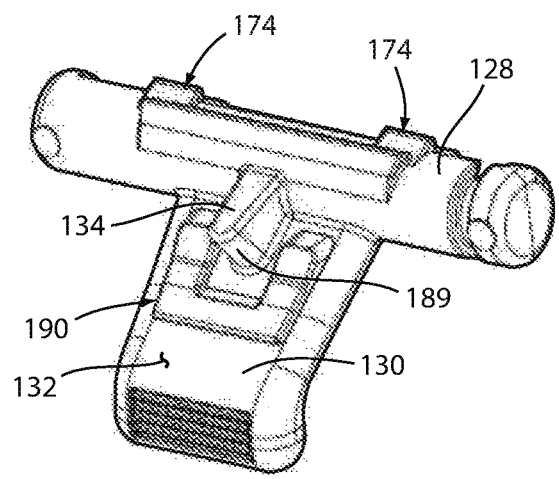
FIG. 13 is a front perspective view of a variation of the part of FIG. 11 useable in a variation of the rearview mirror assembly of FIG. 1.
Figure 14:
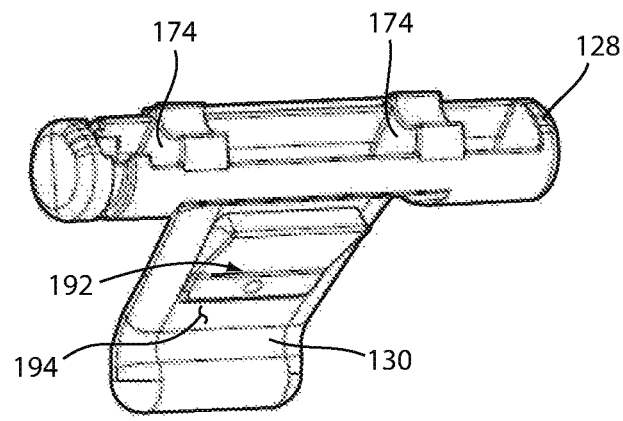
FIG. 14 is a rear perspective view of the part of FIG. 13.
Figure 15:
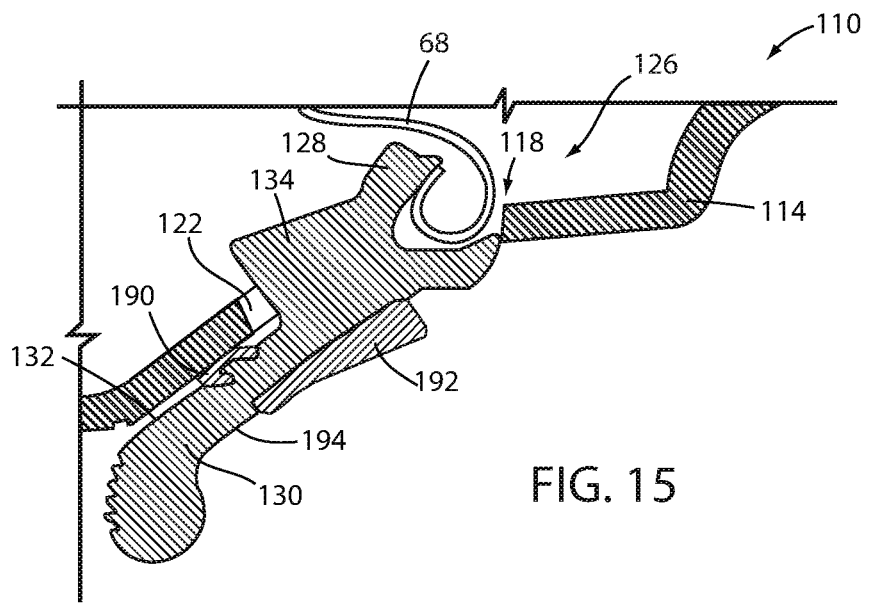
FIG. 15 is a cross-sectional detail view of a portion of a variation of the rearview mirror assembly of FIG. 1 in the first state including the part of FIG. 13.

As depicted in FIGS. 9 and 11, locking rib 34 may define an undercut 89 (or reverse draft angle) such that when notch 22 moves into contact with locking rib 34 it is at least partially received within undercut 89. This configuration contributes to the engagement between notch 22 and locking rib 34, thereby preventing rotation of lever 30 in direction 88 with continued application of force 84. Accordingly, application of force 84 causes movement of mounting plate 48 (as shown in FIGS. 6-8) about mounting arm 42 and not inadvertent actuation of actuation mechanism 26. Further, when force 84 ceases (or changes direction), the force of spring arms 68 urges toggle barrel 28 back into an equilibrium position within cradle portion 80, thereby urging housing 14 slightly outward (i.e. in the opposite direction of direction 86), allowing notch 22 to disengage from locking rib 34, thereby allowing actuation of actuation mechanism 26 by movement of lever 30.

The above-described engagement and disengagement of notch 22 and locking rib 34 allows for prevention of inadvertent actuation without the use of a mechanism that requires additional force to move lever 30 into and out of the first position (FIG. 9). For example, a snap-fit between notch 22 and locking rib 34 may require additional force on lever 30 to overcome the strength of the fit between notch 22 and locking rib 34, which could lead to a failure to engage when lever 30 is moved into the first position or additional force to move out of the first position that could result in inadvertent adjustment of housing 14 with respect to mounting arm 42 by movement of mounting plate 48 with respect thereto.

Figure 16:
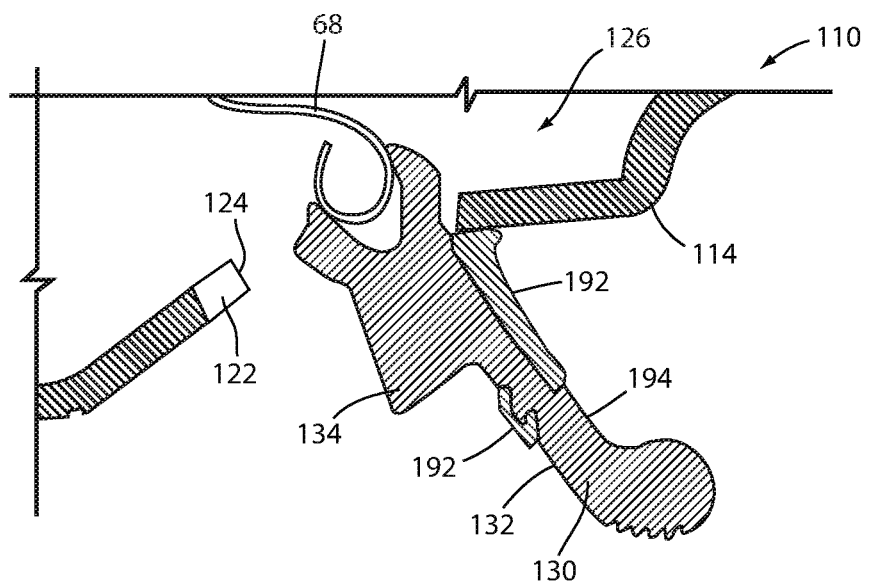
FIG. 16 is a cross-sectional detail view of the portion of the rearview mirror assembly of FIG. 15 in a second state.

A variation of a combined toggle barrel 128 and lever 130 is illustrated in FIGS. 13-16. In particular, in this variation damper inserts 190 and 192 are coupled with the body portion of lever 130 in locations where lever 130 contacts housing 114 adjacent the opening 118 through which lever 130 extends. As shown in FIGS. 13-16, one insert 190 is positioned along the first major surface 132 of lever 130 and the second insert 192 is oppositely positioned along a second major surface 194 of lever 130. In an example, the combined toggle barrel 128 and lever 130 may be of a hard plastic material, such as polycarbonate ("PC"), acrylonitrile butadiene styrene ("ABS"), PC-ABS, or the like. Housing 114 may be made of the same material as or a similar material to toggle barrel 128 and lever 130, which may lead to audible clicks or other noises when lever 130 is moved into either the first position (FIG. 15) or second position (FIG. 16). Accordingly, inserts 190 and 192 may be of a softer (i.e., lower hardness), resiliently-deformable material such as thermoplastic elastomer ("TPE") or other moldable soft-touch materials. In an embodiment, inserts 190 and 192 can be insert molded onto or co-molded with the combined toggle barrel 128 and lever 130. In this manner, inserts 190 and 192 can cushion the impact of lever 130 against housing 114 during movement between the first and second positions thereof, which can serve to reduce any audible noise therefrom.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A rearview mirror for a vehicle, comprising:
   a housing defining an interior and an opening from the interior to an exterior of the housing, a notch extending from the interior to the exterior of the housing contiguous with the opening from an edge of the opening, the opening having a first width and the notch having a second width less than the first width; and
   an actuation mechanism coupled within the interior of the housing and including:
      a toggle barrel rotatably positioned within the interior cavity of the housing; and
      a lever extending from the toggle barrel through the opening, the lever defining a first major surface having a third width greater than the second width and including a locking rib extending from the first major surface adjacent the barrel and having a fourth width less than the third width and less than the second width, the lever being rotatable with corresponding rotation of the toggle barrel with respect to the housing between a first position and a second position, the locking rib being positioned within the notch of the housing when the lever and the toggle barrel are in the first position and being positioned away from the notch when the lever and the toggle barrel are in the second position.

2. The rearview mirror of claim 1, wherein:
   the actuation mechanism further includes a mounting plate rotatably coupled within the cavity of the housing at a first end thereof; and
   the toggle barrel is operatively coupled with the mounting plate such that rotation of the toggle barrel between the first position and the second position rotates the housing about the first end of the mounting plate between first and second stable positions respectively corresponding with the first and second positions of the toggle barrel.

3. The rearview mirror of claim 2, wherein the actuation mechanism further includes a spring plate coupled with the mounting plate and having a resiliently deformable arm extending away from the mounting plate, the arm portion of the spring plate operably coupling the mounting plate with the toggle barrel.

4. The rearview mirror of claim 3, wherein the arm is biased against the toggle barrel to urge the toggle barrel toward a nearest of the first and second positions.

5. The rearview mirror of claim 2, wherein the first and second stable positions are rotationally spaced about the first end of the mounting plate at an angle of between 5 degrees and 10 degrees.

6. The rearview mirror of claim 2, further including a mounting arm coupled with the mounting plate, wherein: the housing defines an aperture, the mounting arm extending through the aperture to an exterior of the housing.

7. The rearview mirror of claim 1, wherein the locking rib forcibly engages with the notch when the lever is in the first position thereby resisting movement of the lever out of the first position.

8. The rearview mirror of claim 7, wherein the locking rib defines an undercut including a surface angled towards the first major surface, the undercut receiving a portion of the notch therein when the lever is in the first position to contribute to rib forcibly engaging with the notch.

9. The rearview mirror of claim 1, wherein the lever includes:
   a body, the first major surface and the rib being defined on the body; and
   a first damper insert coupled with the body along a portion of the first major surface.

10. The rearview mirror of claim 9, wherein:
    the body further defines a second major surface opposite the first surface; and
    the lever further includes a second damper insert coupled with the body along a portion of the second major surface.

11. The rearview mirror of claim 10, wherein:
    the body portion is of a first material having a first hardness; and
    the first and second damper portions are of a second material having a second hardness that is less than the first hardness.

12. The rearview mirror of claim 10, wherein:
    the body portion defines an aperture therethrough; and
    the first and second damper portions are integrally joined through the aperture.

13. The rearview mirror of claim 1, wherein:
    the interior of the housing defines a support rib having a cradle portion and a ramp portion; and
    the toggle barrel is rotatably positioned within the housing by operative engagement with the support rib such that, during rotation of the toggle barrel between the first and second positions by movement of the lever, the toggle barrel is positioned within the cradle portion and, when the toggle barrel is in the first position, a force applied on the housing moves the toggle barrel at least partially into the ramp portion, thereby moving the locking rib into contact with a portion of the notch.

14. The rearview mirror of claim 1, further including a display substrate coupled over the open side of the housing and having a reflective surface thereon.

15. A vehicle, comprising:
    a windshield;
    a headliner adjacent an upper edge of the windshield; and
    a mirror assembly, comprising:
       a housing defining an interior cavity and an opening from the interior to an exterior of the housing, a notch extending from the interior cavity to the exterior of the housing and contiguous with an edge of the opening, the opening having a first width and the notch having a second width less than the first width; and
       an actuation mechanism coupled within the interior of the housing and including:
          a toggle barrel rotatably positioned within the interior cavity of the housing; and
          a lever extending from the toggle barrel through the opening, the lever defining a first major surface having a third width greater than the second width and including a locking rib extending from the first major surface adjacent the barrel and having a fourth width less than the third width and less than the second width, the lever being rotatable with corresponding rotation of the toggle barrel with respect to the housing between a first position and a second position, the locking rib being positioned within the notch of the housing when the lever and the toggle barrel are in the first position and being positioned away from the notch when the lever and the toggle barrel are in the second position.

16. The vehicle of claim 15, wherein the locking rib defines an undercut including a surface angled towards the first major surface, the undercut receiving a portion of the notch thereunder when the lever is in the first position to contribute to rib forcibly engaging with the notch.

17. The rearview mirror of claim 15, wherein the lever includes:
- a body, the first major surface, the rib, and a second major surface opposite the first surface being defined on the body;
- a first damper insert coupled with the body along a portion of the first major surface; and
- a second damper insert coupled with the body along a portion of the second major surface.

18. The rearview mirror of claim 17, wherein:
the body portion is of a first material having a first hardness; and
the first and second damper portions are of a second material having a second hardness that is less than the first hardness.

19. The rearview mirror of claim 17, wherein:
the body portion defines an aperture therethrough; and
the first and second damper portions are integrally joined through the aperture.

20. A rearview mirror for a vehicle, comprising:
a housing defining an interior cavity and an opening from the interior cavity to an exterior of the housing, a notch extending from the interior cavity to the exterior of the housing and contiguous with an edge of the opening, the opening having a first width and the notch having a second width less than the first width; and
an actuation mechanism coupled within the interior of the housing and including:
- a toggle barrel rotatably positioned within the interior cavity of the housing; and
- a lever extending from the toggle barrel through the opening, the lever defining a first major surface having a third width greater than the second width and including a locking rib extending from the first major surface adjacent the barrel and having a fourth width less than the third width, the lever being rotatable with corresponding rotation of the toggle barrel with respect to the housing including into a first position wherein the locking rib is forcibly engaged with the notch to resist movement of the lever out of the first position.

* * * * *